United States Patent
Chandramouli et al.

(10) Patent No.: US 9,667,481 B2
(45) Date of Patent: May 30, 2017

(54) CORRELATION IDENTIFIER FOR USER PLANE CONGESTION AND OTHER USE CASES

(71) Applicant: NOKIA SOLUTIONS AND NETWORKS OY, Espoo (FI)

(72) Inventors: Devaki Chandramouli, Plano, TX (US); Rainer Liebhart, Munich (DE); Martin Oettl, Weilheim (DE)

(73) Assignee: NOKIA SOLUTIONS AND NETWORKS OY, Espoo (FI)

( * ) Notice: Subject to any disclaimer, the term of this patent is extended or adjusted under 35 U.S.C. 154(b) by 120 days.

(21) Appl. No.: 14/508,786

(22) Filed: Oct. 7, 2014

(65) Prior Publication Data

US 2016/0100326 A1  Apr. 7, 2016

(51) Int. Cl.
   *H04L 12/24* (2006.01)
   *H04W 8/26* (2009.01)
   *H04W 28/02* (2009.01)

(52) U.S. Cl.
   CPC ......... *H04L 41/0803* (2013.01); *H04W 8/26* (2013.01); *H04W 28/0289* (2013.01)

(58) Field of Classification Search
   CPC ......... H04W 36/0022; H04W 36/0033; H04W 76/021; H04W 76/064; H04W 8/26; H04W 28/0289; H04L 41/0803
   See application file for complete search history.

(56) References Cited

U.S. PATENT DOCUMENTS

| | | | |
|---|---|---|---|
| 7,805,127 B2 * | 9/2010 | Andreasen | G06Q 20/102 455/405 |
| 9,277,047 B2 * | 3/2016 | Racz | H04W 24/08 |
| 2011/0199987 A1 | 8/2011 | Rommer et al. | |
| 2012/0051323 A1 | 3/2012 | Wolfner et al. | |

FOREIGN PATENT DOCUMENTS

WO   2010088953 A1   8/2010

OTHER PUBLICATIONS

3GPP TS 23.003 V12-4.0 (Sep. 2014); 3rd Generation Partnership Project; Technical Specification Group Core Network and Terminals; Numbering, addressing and identification (Release 12).

(Continued)

*Primary Examiner* — Ayaz Sheikh
*Assistant Examiner* — Debebe Asefa
(74) *Attorney, Agent, or Firm* — Squire Patton Boggs (US) LLP (57) ABSTRACT

Various communication systems may benefit from an identifier that can correlate a user equipment or a packet data network connection with a particular cell. For example, a correlation identifier may be useful to address management of user plane congestion and other use cases. A method can include generating a correlation identifier for a user equipment and/or a packet data network connection. The method also includes the ability to identify the user context information with the same correlation ID in the core network and in the radio access network. The method can also include sending the correlation identifier to a network element.

29 Claims, 9 Drawing Sheets

(56) References Cited

OTHER PUBLICATIONS

S2-141658 (revision of S2-14xxxx); Ericsson; "Enhancements to solution 1.5.3"; SA WG2 Meeting #103; May 19-23, 2014, Phoenix, Arizona, USA.
S2-143359 (revision of S2-14xxxx); Nokia Networks; "Correlation between Cells and UEs"; SA WG2 Meeting #105; Oct. 13-17, 2014, Sapporo, Japan.
International Search Report and Written Opinion application No. PCT/EP2015/072692 mailed Dec. 9, 2015.
3GPP TS 23.203 V13.1.0 (Sep. 2014), Technical Specification; 3rd Generation Partnership Project; Technical Specification Group Services and System Aspects; Policy and charging control architecture (Release 13); 650 Route des Lucioles; Sophia-Antipolis Valbonne; France; 223 pages.
3GPP TS 22.101 V13.3.0 (Sep. 2014), Technical Specification; 3rd Generation Partnership Project; Technical Specification Group Services and System Aspects; Service aspects; Service principles (Release 13); 650 Route des Lucioles; Sophia-Antipolis Valbonne; France; 88 pages.
3GPP TR 23.705 V1.0.0 (Aug. 2014), Technical Specification; 3rd Generation Partnership Project; Technical Specification Group Services and System Aspects; Study on system enhancements for user plane congestion management (Release 13); 650 Route des Lucioles; Sophia-Antipolis Valbonne; France; 61 pages.
3GPP TS 23.401 V13.0.0 (Sep. 2014), Technical Specification; 3rd Generation Partnership Project; Technical Specification Group Services and System Aspects; General Packet Radio Service (GPRS) enhancements for Evolved Universal Terrestrial Radio Access Network (E-UTRAN) access (Release 13); 650 Route des Lucioles; SophiaAntipolis Valbonne; France; 308 pages.
3GPP TS 23.060 V13.0.0 (Sep. 2014), Technical Specification; 3rd Generation Partnership Project; Technical Specification Group Services and System Aspects; General Packet Radio Service (GPRS); Service description; Stage 2 (Release 13); 650 Route des Lucioles; Sophia-Antipolis Valbonne; France; 350 pages.

* cited by examiner

Figure 1

RELATED ART

CORRELATION IDENTIFIER FOR USER
PLANE CONGESTION AND OTHER USE
CASES

BACKGROUND

Field

Various communication services may benefit from an identifier that can correlate a user equipment or a packet data network connection with a particular cell or area. For example, a correlation identifier may be useful to address management of user plane congestion (to identify which devices are located in a congested cell).

Description of the Related Art

The Evolved Packet System (EPS) provides a new radio interface and a new packet core network functions for broadband wireless data access. The EPS core network (or IP-CAN) can include the Mobility Management Entity (MME), packet data network gateway (P-GW) and serving gateway (S-GW).

Figure 1:
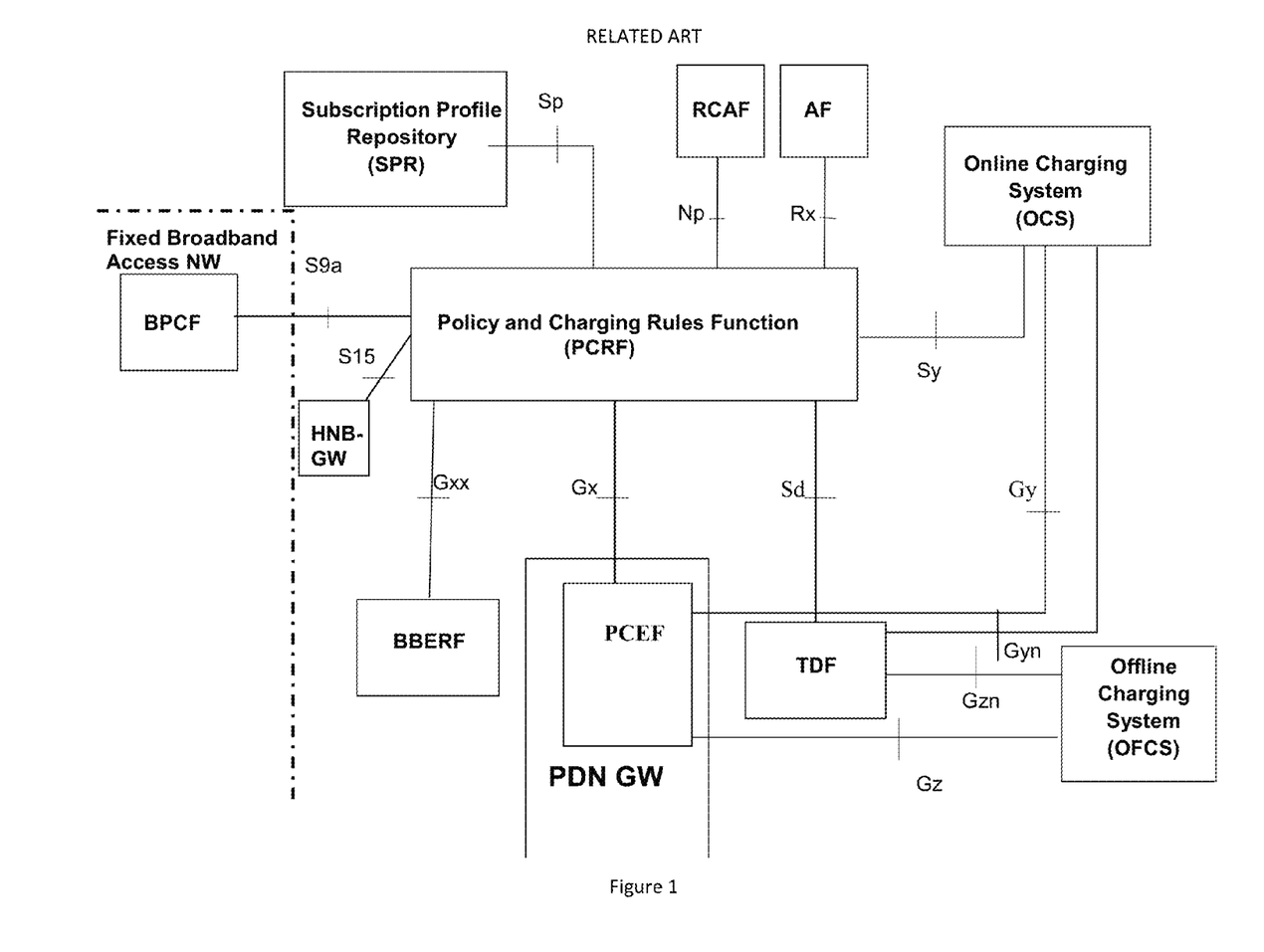
FIG. 1 illustrates an overall PCC architecture.

FIG. 1 illustrates an overall PCC architecture. For a more complete discussion of this architecture, see 3GPP TS 23.203, which is hereby incorporated herein by reference in its entirety.

The Policy Charging Control (PCC) architecture, including deep packet inspection (DPI) functionality in traffic detection function (TDF) and policy and charging enforcement function (PCEF) enhanced with application detection and control (ADC) rules, extends the architecture of an IP-CAN, where the PCEF is a functional entity in the gateway node, such as a P-GW or gateway general packet radio service (GPRS) support node (GGSN), providing the IP access to the packet data network (PDN).

System requirements for user plane congestion management (UPCON) are described in 3GPP TS 22.101, which is hereby incorporated herein by reference in its entirety. 3GPP TR 23.705 (which is also hereby incorporated herein by reference in its entirety) documents an agreement to follow a so-called core network (CN) based solution by which congestion information from the radio access network (RAN) is used in the Core to perform congestion mitigation.

Figure 2:
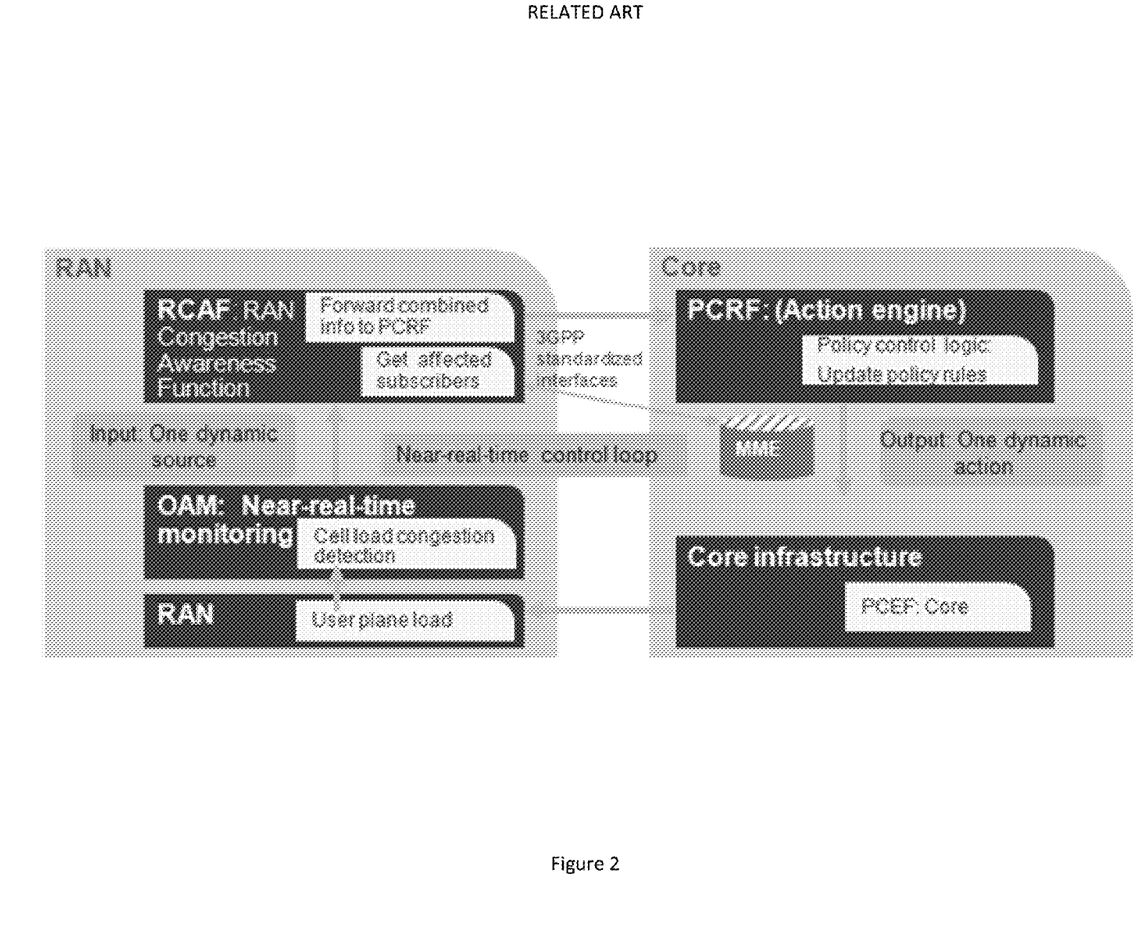
FIG. 2 illustrates an UPCON control loop.

FIG. 2 illustrates an UPCON control loop. A logical function, the RAN congestion awareness function (RCAF), is defined. The RCAF collects operations, administration and maintenance (OAM)-based non-real-time RAN user plane congestion status per eNB or radio cell, and generates congestion indications towards the core network including affected subscribers. Two new reference points are introduced: between RCAF and MME/SGSN to get the affected subscribers (in terms of their international mobile subscriber identities (IMSIs)) in a cell, and between the RCAF and PCRF to pass on the combined RAN user plane congestion status to the PCRF. The approach may permit per-UE/bearer policy decisions to be taken by the PCRF.

Figure 3:
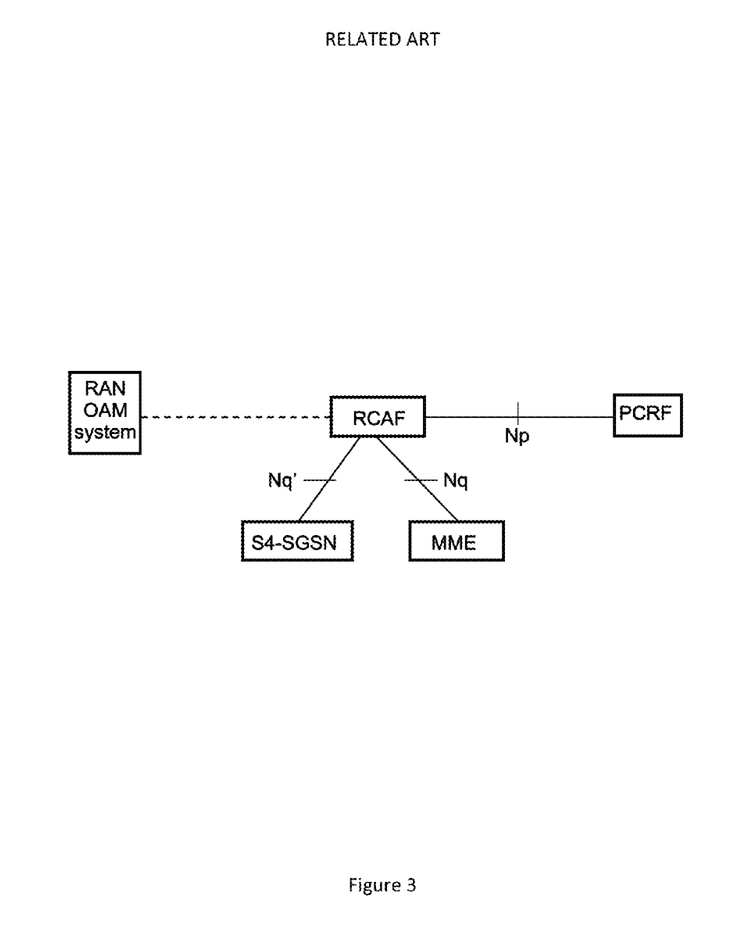
FIG. 3 illustrates a reference architecture for RAN user plane congestion detection and reporting.

FIG. 3 illustrates a reference architecture for RAN user plane congestion detection and reporting. For a more complete discussion of this architecture, see 3GPP TS 23.203. The interface between RAN's OAM system and the RCAF is not specified, while the interfaces between MME/SGSN and RCAF (Nq and Nq') are specified in 3GPP TS 23.401 and 3GPP TS 23.060 and enable the RCAF to retrieve the list of UEs (respectively their IMSIs), which are currently camping in congested cells as reported by RAN's OAM system. The PCRF receives RAN User Plane Congestion Information reports (called RUCI) from the RCAF via Np as another input for policy decisions as described in section 6.2.1.1 of 3GPP TS 23.203. Each of 3GPP TS 23.401 and 3GPP TS 23.060 is hereby incorporated herein by reference in its entirety.

The PCRF performs congestion mitigation actions on a per UE basis. Thus, the PCRF may require information regarding which UEs are in congested cells, before making policy decisions.

The OAM RAN system is configured to provide on a regular basis a list of congested cells to the RCAF. The list does not provide identities of UEs that are camping in those cells. Thus, conventionally the RCAF cannot simply forward the list of congested cells towards the PCRF, as the PCRF is unaware which UEs are in which cells. PCRF acts on a per UE and not on a per cell or location area basis.

Conventionally, only RAN nodes, such as eNBs, are aware which UEs are in which cells.

3GPP decided that RCAF needs to query MME/SGSN for identities of UEs camping in congested cells. In turn, MME/SGSN queries the eNB/RNC for current location of UEs.

Once RCAF has identified which UEs are impacted by congestion, it informs the PCRF via RUCI reports. PCRF in turn executes congestion mitigation measures on a per UE basis.

The E-UTRAN cell global identifier (ECGI) stored in the MME may be obsolete information as the eNB is not required to inform the MME/SGSN about all cell changes. Intra-eNB cell changes, such as handovers between cells hosted by the same eNB, do not require that MME/SGSN be informed about such a cell change. Also inter-eNB handover, so-called X2 handovers where two eNBs have a direct signalling connection, do not necessarily require that MME/SGSN be informed by RAN.

As MME/SGSN are not always up-to-date regarding the cell via which a UE is currently connected to the network, the query sent by the RCAF containing congested cells and the response sent by MME/SGSN back to RCAF may provide wrong results, which implies that UEs currently camping in a non-congested cell may erroneously suffer from congestion mitigation measures. Or the other way around, UEs camping in a congested cell but assumed by the MME/SGSN as being in a non-congested cell, can continue generating huge amount of traffic and so prolonging the congestion state of the cell.

On top of that it can be questioned whether the current solution envisaged by 3GPP that RCAFs have to query MMEs/SGSNs for identifying the impacted UEs is the best approach. The current solution assumes that RCAF compares existing congestion information with information in a new report received from RAN OAM, performing a new query towards MME/SGSN.

As stated above, the solution that RCAF queries the MME/SGSN to retrieve IMSIs of UEs camping in congested cells raises some issues. First, the current location of the UE is not always known accurately by the MME/SGSN as the RAN does not report all cell changes to the core network. Second, the solution requires introducing new interfaces between RCAF and MME/SGSN, which raises backward compatibility issues and increases the complexity in the network and the whole solution. Third, the solution requires that MME/SGSN are searching through their whole context data table with cell ID as search key just to find a probably small number of affected UEs and return the corresponding IMSIs. Fourth, the new functional entity RCAF and other entities involved in this solution (RAN OAM, MME/SGSN, PCRF) have to store context information (either per cell, per UE or both). The RCAF needs to correlate cell ID, TAI, IMSI and PCRF data.

In summary, an issue with the UPCON solution as described above is the missing direct correlation link between information available in PCRF based on user identities like IMSI and information available in RAN nodes (eNBs) based on cell IDs. For security reasons the IMSI cannot be sent to RAN, thus cannot be used as correlation ID. As a consequence the UPCON solution requires that new interfaces towards MME/SGSN are introduced just for the sake to provide a mapping between cell ID and IMSI.

Although there may be other ways of identifying PDN connections, these other ways may not address the above-identified issues. For example, solutions related to proxy mobile IP (PMIP) and a situation of identifying one connection out of multiple PDN connections to the same APN may not have relevance in E-UTRAN. This may be because an APN may have no meaning or relevance in the radio network. Moreover, PMIP may only pertain to S5/S8.

SUMMARY

According to a first embodiment, a method can include generating, by a device, a correlation identifier for a user equipment and/or a packet data network connection. The method can also include sending, by the device, the correlation identifier to a network element. The correlation identifier can correlate the user equipment and/or the packet data network connection to a core network element. The correlation identifier can correlate the user equipment between the core network and the radio access network.

According to a second embodiment, a method can include receiving, at a device, a correlation identifier for a user equipment and/or a packet data network connection. The method can also include forwarding, by the device, the correlation identifier to a further network element. The correlation identifier can correlate the user equipment and/or the packet data network connection to a core network element. The correlation identifier can correlate the user equipment between the core network and the radio access network.

According to a third embodiment, a method can include preparing, by a device, a report of congestion including a correlation identifier for a user equipment and/or a packet data network connection. The method can also include sending, by the device, the report to an operations, administration and maintenance server. The correlation identifier can correlate the user equipment and/or the packet data network connection to a core network element. The correlation identifier can correlate the user equipment between the core network and the radio access network.

According to a fourth embodiment, a method can include receiving, at a device, congestion report including a correlation identifier for a user equipment and/or a packet data network connection. The method can also include identifying, by the device, a policy and charging rules function to which to send the congestion report based on the correlation identifier. The method can further include sending, by the device, the congestion report to the policy and charging rules function. The correlation identifier correlates the user equipment and/or the packet data network connection to a core network element. Optionally, the correlation identifier can correlate the user equipment between the core network and the radio access network.

According to a fifth embodiment, an apparatus can include means for generating, by a device, a correlation identifier for a user equipment and/or a packet data network connection. The apparatus can also include means for sending, by the device, the correlation identifier to a network element. The correlation identifier can correlate the user equipment and/or the packet data network connection to a core network element. The correlation identifier can correlate the user equipment between the core network and the radio access network.

According to a sixth embodiment, an apparatus can include means for receiving, at a device, a correlation identifier for a user equipment and/or a packet data network connection. The apparatus can also include means for forwarding, by the device, the correlation identifier to a further network element. The correlation identifier can correlate the user equipment and/or the packet data network connection to a core network element. The correlation identifier can correlate the user equipment between the core network and the radio access network.

According to a seventh embodiment, an apparatus can include means for preparing, by a device, a report of congestion including a correlation identifier for a user equipment and/or a packet data network connection. The apparatus can also include means for sending, by the device, the report to an operations, administration and maintenance server. The correlation identifier can correlate the user equipment and/or the packet data network connection to a core network element. The correlation identifier can correlate the user equipment between the core network and the radio access network.

According to an eighth embodiment, an apparatus can include means for receiving, at a device, congestion report including a correlation identifier for a user equipment and/or a packet data network connection. The apparatus can also include means for identifying, by the device, a policy and charging rules function to which to send the congestion report based on the correlation identifier. The apparatus can further include means for sending, by the device, the congestion report to the policy and charging rules function. The correlation identifier correlates the user equipment and/or the packet data network connection to a core network element. Optionally, the correlation identifier can correlate the user equipment between the core network and the radio access network.

According to a ninth embodiment, an apparatus can include at least one processor and at least one memory including computer program code. The at least one memory and the computer program code can be configured to, with the at least one processor, cause the apparatus at least to generate a correlation identifier for a user equipment and/or a packet data network connection. The at least one memory and the computer program code can also be configured to, with the at least one processor, cause the apparatus at least to send the correlation identifier to a network element. The correlation identifier can correlate the user equipment and/or the packet data network connection to a core network element. The correlation identifier can correlate the user equipment between the core network and the radio access network.

According to a tenth embodiment, an apparatus can include at least one processor and at least one memory including computer program code. The at least one memory and the computer program code can be configured to, with the at least one processor, cause the apparatus at least to receive a correlation identifier for a user equipment and/or a packet data network connection. The at least one memory and the computer program code can also be configured to, with the at least one processor, cause the apparatus at least to forward the correlation identifier to a further network element. The correlation identifier can correlate the user equipment and/or the packet data network connection to a core network element. The correlation identifier can correlate the user equipment between the core network and the radio access network.

According to an eleventh embodiment, an apparatus can include at least one processor and at least one memory including computer program code. The at least one memory and the computer program code can be configured to, with the at least one processor, cause the apparatus at least to prepare a report of congestion including a correlation identifier for a user equipment and/or a packet data network connection. The at least one memory and the computer program code can also be configured to, with the at least one processor, cause the apparatus at least to send the report to an operations, administration and maintenance server. The correlation identifier can correlate the user equipment and/or the packet data network connection to a core network element. The correlation identifier can correlate the user equipment between the core network and the radio access network.

According to a twelfth embodiment, an apparatus can include at least one processor and at least one memory including computer program code. The at least one memory and the computer program code can be configured to, with the at least one processor, cause the apparatus at least to receive congestion report including a correlation identifier for a user equipment and/or a packet data network connection. The at least one memory and the computer program code can also be configured to, with the at least one processor, cause the apparatus at least to identify a policy and charging rules function to which to send the congestion report based on the correlation identifier. The at least one memory and the computer program code can further be configured to, with the at least one processor, cause the apparatus at least to send the congestion report to the policy and charging rules function. The correlation identifier can correlate the user equipment and/or the packet data network connection to a core network element. Optionally, the correlation identifier can correlate the user equipment between the core network and the radio access network.

According to thirteenth through sixteenth embodiments, a computer program product can encode instructions for performing the method according to any of the first through fourth embodiments.

According to seventeenth through twentieth embodiments, a non-transitory computer readable medium can be encoded with instructions that, when executed in hardware, perform a process. The process can include the method according to any of the first through fourth embodiments.

BRIEF DESCRIPTION OF THE DRAWINGS

For proper understanding of the invention, reference should be made to the accompanying drawings, wherein.

DETAILED DESCRIPTION

Certain embodiments introduce a correlation ID that can help uniquely identify across the network, such as from AF, PCRF to radio network. Certain embodiments, for example, may enable a PCRF to identify impacted UEs without involving the RCAF and without involving the MME/SGSN. Moreover, certain embodiments may accomplish this non-involvement without introducing new and unnecessary interfaces like Nq/Nq'.

More specifically, certain embodiments provide an option for a UPCON correlation ID used in PCRF, RAN and RCAF, which avoids a need for the RCAF to query MME/SGSN. Indeed, in certain embodiments no new interfaces at MME/SGSN are required. Certain embodiments also avoid any need for the RCAF to store the mapping of user identities and cell IDs to PCRF, which makes the RCAF implementation simpler. The correlation ID can be used for other situations or scenarios as well, and not only within the UPCON solution. Thus, although the UPCON scenario is illustrated in certain use cases, use of correlation ID for other use cases is also described below.

For simplicity the following discussion focuses on EPC and E-UTRAN access, while in principle the solution can also be adopted for a GPRS core network and UTRAN/GERAN access networks.

Figure 4:
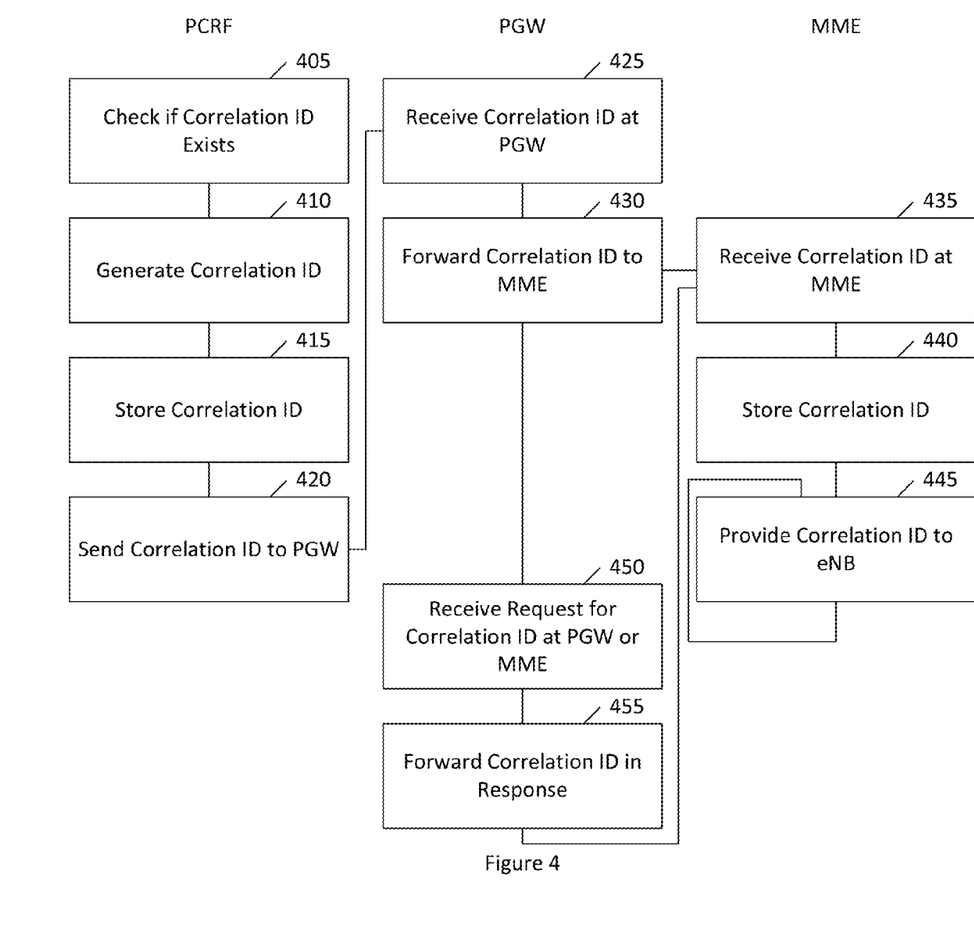
FIG. 4 illustrates a method according to certain embodiments.

FIG. 4 illustrates a method according to certain embodiments. As shown in FIG. 4, at 410 the PCRF can generate a correlation ID, called "Correlation RUCI ID" (C-RUCI-ID), for a particular user and/or PDN connection, or more generally for a user and/or IP-CAN session. C-RUCI-ID can be generated per user or PDN connection. In case the PCRF generates C-RCUI-ID per user, the PCRF can check at 405 whether a correlation ID for a given IMSI already exists before generating a new one. In case the PCRF generates the C-RCUI-ID per PDN connection, the PCRF can check, at 405, whether a correlation ID for a given IMSI and APN pair already exists before generating a new one. PCRF can, at 415, store C-RUCI-ID either locally or in the SPR/HSS for the lifetime of a PDN connection.

The generated C-RUCI-ID can be configured to be unique per UE and PCRF and the generated C-RUCI-ID can be structured in a way that the C-RUCI-ID identifies the PCRF and UE uniquely.

In certain embodiments, C-RUCI-ID contains a PCRF name part, such as "pcrf1" or "pcrf2" and a UE part such as "9565778269". C-RUCI-ID could then look like "9565778269.pcrf1.mnc.mcc.gprs.com" where "9565778269" identifies the user/PDN connection and "pcrf1.mnc.mcc.gprs.com" identifies the PCRF (i.e. DNS lookup can provide an IP address of the PCRF).

At 420, the PCRF can send the C-RUCI ID to the PGW via Gx interface. At 425, the PGW can receive the C-RUCI ID. Then, at 430, the PGW can forward the C-RUCI-ID via GTP-C signaling on S5/S8 and S11 interfaces to the MME during PDN connection establishment. C-RUCI-ID can also be provided by other means to the MME, e.g. via GTP-U and PMIP on S5/S8 to SGW and then via GTP-C on S11 to MME.

At 435, the MME can receive the C-RUCI-ID. Then, at 440, the MME can store the C-RUCI-ID in the MME's mobility or session management context data. Alternatively, the C-RUCI-ID can be stored remotely, for example, in an external database. At 445, the MME can provide the C-RUCI-ID via S1 signalling to the eNB, for example in an Initial Context Setup Request. Moreover, whenever the UE goes into idle mode, RRC idle in E-UTRAN, and returns to connected mode, RRC connected in E-UTRAN, after some while, the MME can provide the C-RUCI-ID again in S1 signaling to the eNB.

At 450, the method can include receiving a location request or other request to provide correlation identifiers. This request can be received at the P-GW, MME, or other network element. Based on this request, at 455, the method can include reforwarding the correlation identifier to the further network element.

Figure 5:
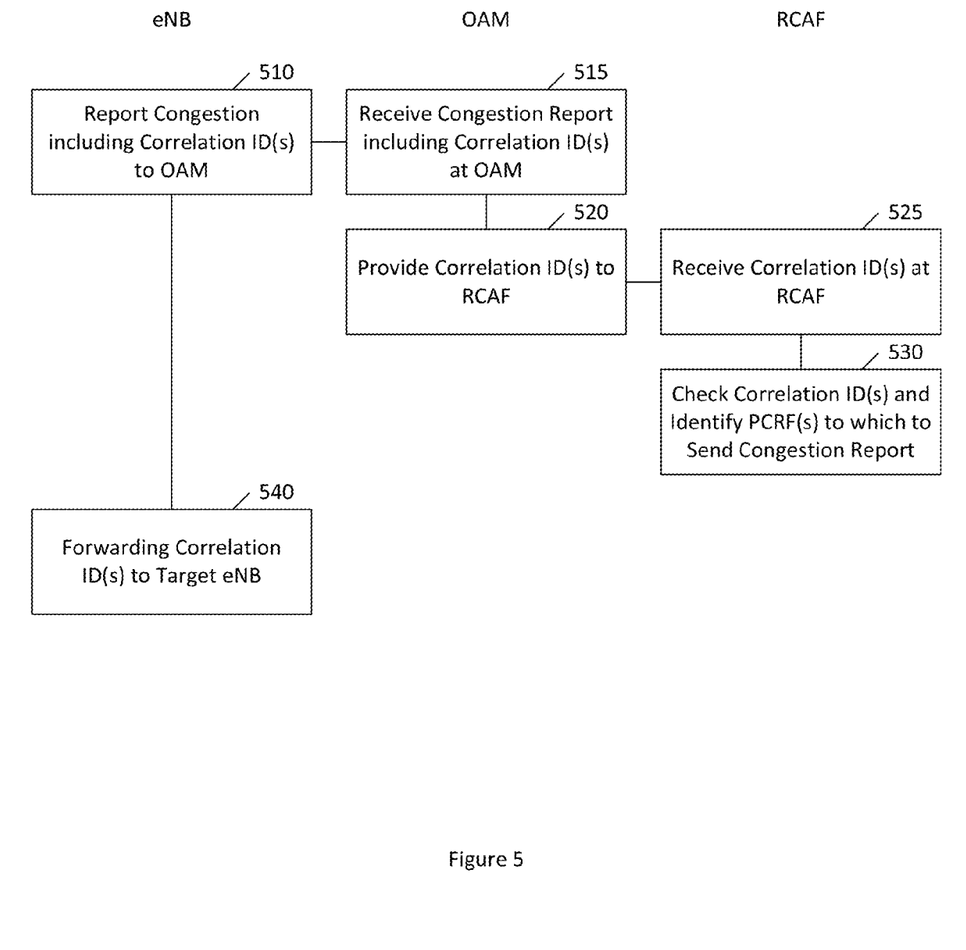
FIG. 5 illustrates a further method according to certain embodiments.

FIG. 5 illustrates a further method according to certain embodiments. As shown in FIG. 5, at 510, when the eNB reports to OAM that a certain cell is congested, it reports also all C-RUCI-IDs of connected UEs camping in this cell. This may assure that C-RUCI-ID to ECGI mapping is always accurate since this correlation happens between the sender and the receiver, even in intra-eNB handover cases. After receiving such a congestion report at 514, at 520 RAN OAM can provide these data to RCAF. After receiving such data at 525, the RCAF can, at 530, check the C-RUCI-IDs and identify, based on the "PCRF" name part of the IDs, to which PCRF a congestion report needs to be sent.

If the UE moves between cells, C-RUCI-ID can be sent, at 540, during handover via X2 and S1 signaling from source to target eNB. Thus, target eNB can provide C-RUCI-ID in the target eNB's next congestion report to RAN OAM/RCAF, in case the target cell is congested, while source eNB does not provide the C-RUCI-ID of a UE that has moved to another cell in subsequent reports.

With the introduction of C-RUCI-ID, querying the MME may not be needed for purposes such as making a correlation between UE and congested cell. The RCAF may need to send only one report per PCRF. Thus, the RCAF may be able to aggregate user and cell information destined for a particular PCRF into one congestion report, instead of sending congestion reports for individual users. This may reduce the amount of signaling between RCAF and PCRF.

A current assumption in 3GPP is that the RCAF needs to inform the PCRF when the status of a UE changes from congested to not-congested. For example, a situation may arise either when the cell status changed or when the UE moved to a new cell, which is not congested. Such reporting may require that RCAF stores information on the mapping between C-RUCI-ID, cell ID and congestion status.

There are at least two ways of handling the situation for UPCON when no report is received from a cell due to no congestion. In a first way, RAN OAM may detect change in the congestion status from "congested" to "non-congested" based on a local timer and may report this change of status to the RCAF. Alternatively, there may be simply not be any expectation that RAN OAM will report changes in cell congestion status from "congested" to "non-congested" to the RCAF.

Figure 6:
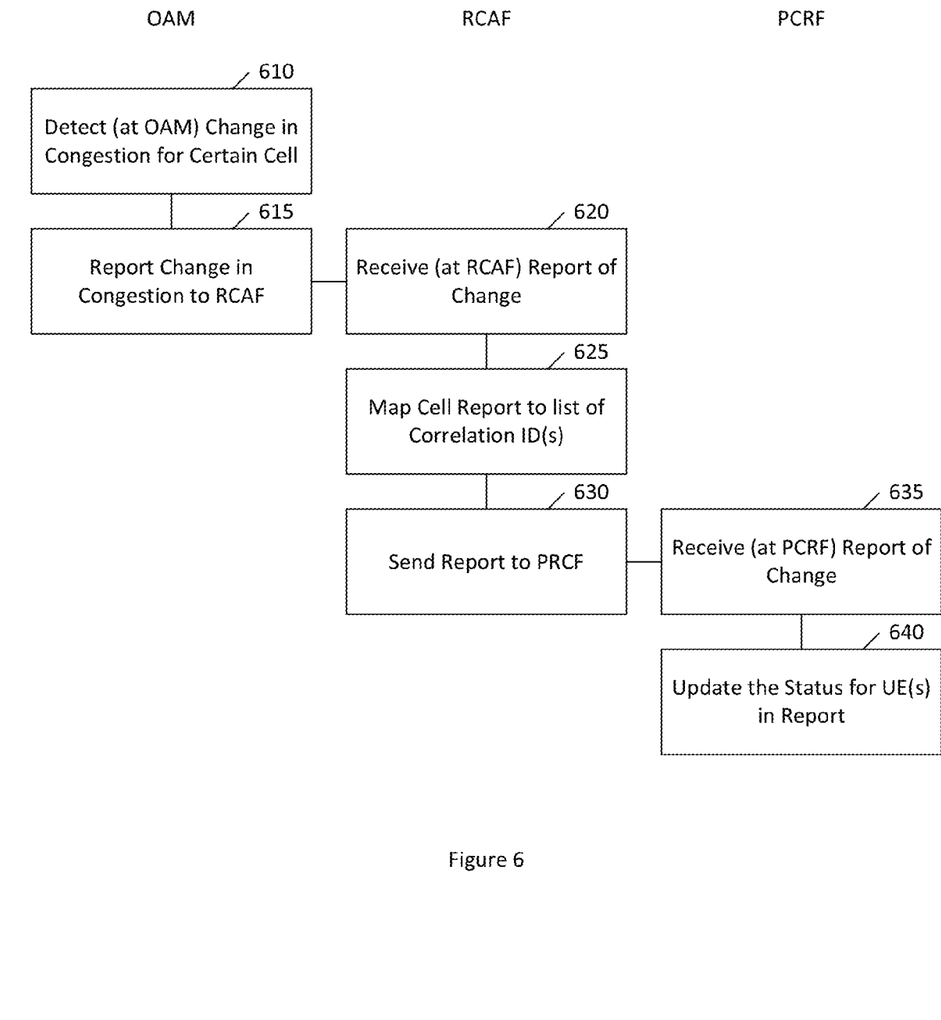
FIG. 6 illustrates another method according to certain embodiments.

FIG. 6 illustrates another method according to certain embodiments. As shown in FIG. 6, at 610 the RAN OAM can detect change in congestion for a certain cell and can report this to the RCAF at 615. At 620, the RCAF can receive this report. The RCAF can, at 625, map the cell report to the list of C-RUCI-ID(s). Then, the RCAF can, at 630, send it to the PCRF. At 635, the PCRF can receive the report and, at 640, can update the status for the UE(s) identified by C-RUCI-ID(s).

Figure 7:
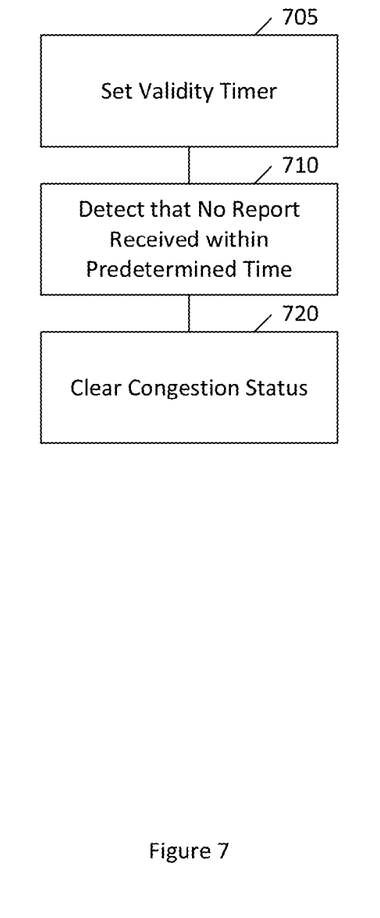
FIG. 7 illustrates an additional method according to certain embodiments.

FIG. 7 illustrates an additional method according to certain embodiments. When there is not any expectation that RAM OAM will report changes in cell congestion status from "congested" to "non-congested" to the RCAF, the PCRF can detect, at 710, that no report is received for a C-RUCI-ID for a certain time, for example the PCRF can detect that no report has been received for longer than two subsequent reporting periods. The PCRF can, at 720, clear the congestion status accordingly. This detection could be done based on a validity timer in the PCRF, which could be set at 705. Clearing the congestion status for a certain UE/C-RUCI-ID may involve the PCRF updating or removing policy rules for the affected UE.

States in the RCAF can be avoided in this case. RCAF can simply pass any congestion reports to the PCRF(s). These reports include at least cell ID, congestion status, and C-RUCI-IDs. The PCRF can update "congestion status" for the UE whenever the PCRF obtains new reports from the RCAF. If the PCRF does not obtain a congestion report for a certain time, the PCRF can clear the congestion status, as mentioned above.

The correlation ID can be applied to other use cases, as mentioned above. For example, in case of group communication service for LTE, the group communication system enabler (GCSE) AS may be interested in radio congestion status for both unicast and MBMS broadcast. The resulting information can be used to determine the users camping in a certain cell in order to determine whether multicast, broadcast or unicast should be performed for group communication. In this case, the following steps may apply, as illustrated in FIG. 8.

Figure 8:
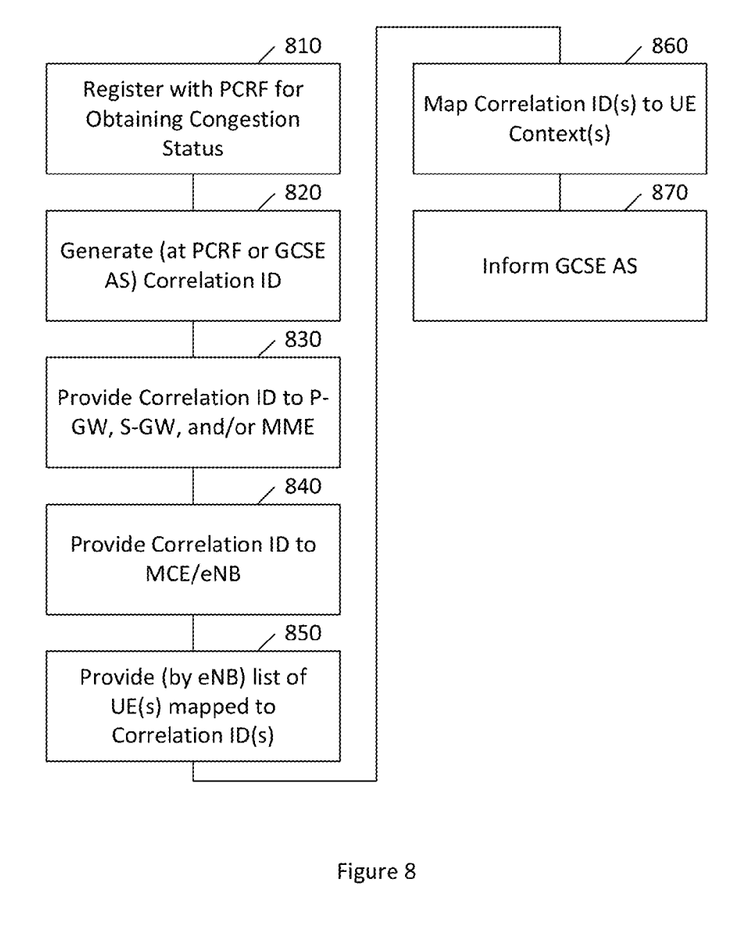
FIG. 8 illustrates another method according to certain embodiments.

FIG. 8 illustrates another method according to certain embodiments. As shown in FIG. 8, at 810 a GCSE AS, or other network element, can register with the PCRF for obtaining congestion status information periodically. Then, at 820, the PCRF generates a correlation ID and, at 830 provides this during the IP-CAN session establishment for unicast bearers towards the P-GW, S-GW MME as explained above using S5/S8/S11 signalling/user plane messages.

At 840, the MME can provide the correlation ID to the MCE/eNB during initial context setup and/or session establishment.

Then, while reporting unicast and/or MBMS broadcast related congestion information, eNB can, at 850, provide the list of UE(s) based on correlation ID.

At 860, upon receiving the list of UE(s) based on correlation ID, the PCRF can map the correlation ID to the UE context and, at 870, inform the GCSE AS. Alternatively, this correlation ID could also be known to the GCSE AS and/or generated by the GCSE AS (at 820) for a certain user. In this case, generating and mapping of identifier is not needed at the PCRF.

In case of location based services, any AF that is interested in user location information can register with the PCRF, following a procedure similar to that discussed above. In this case, the AF can e.g. register with the PCRF for obtaining location information periodically. The PCRF can generate a correlation ID and provide this during the IP-CAN session establishment for unicast bearers towards the P-GW, S-GW, MME as explained above using S5/S8/S 11 signalling or user plane messages.

MME can provide the correlation ID to the eNB during initial context setup and/or session establishment. Then, while reporting location information, the eNB can provide the correlation ID as UE identifier to the network (e.g. to the MME). The PCRF can, upon reception, map the correlation ID to the UE context and inform the AF.

In addition to the above examples, the network can use the correlation ID for other purposes as well, such as input to network dimensioning: network dimensioning tools can retrieve correlation IDs of users camping in a certain cell. The result can be used to calculate average number of users in these cells over a certain time period.

Figure 9:
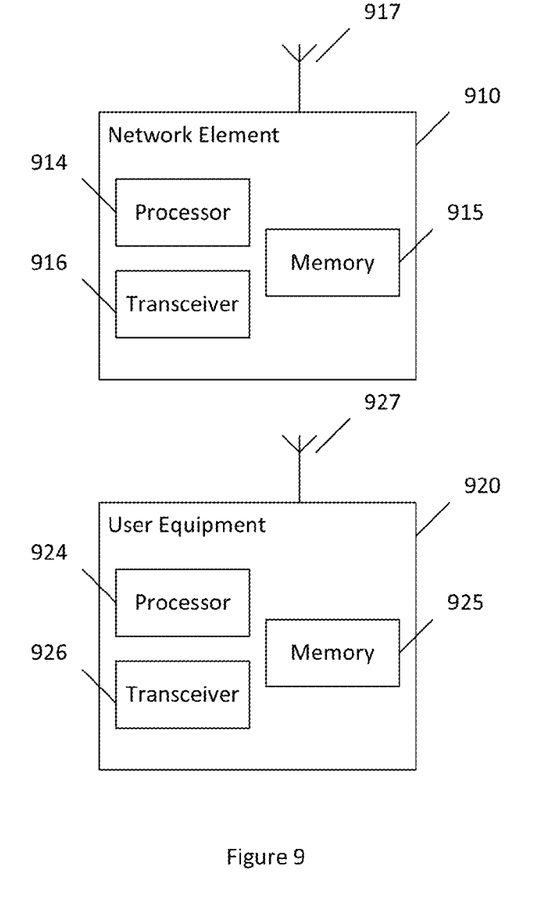
FIG. 9 illustrates a system according to certain embodiments.

FIG. 9 illustrates a system according to certain embodiments of the invention. It should be understood that each block of the flowchart of any of FIGS. 4-8 may be implemented by various means or their combinations, such as hardware, software, firmware, one or more processors and/or circuitry. In one embodiment, a system may include several devices, such as, for example, network element 910 and user equipment (UE) or user device 920. The system may include more than one UE 920 and more than one network element 910, although only one of each is shown for the purposes of illustration. A network element can be an access point, a base station, an eNode B (eNB), PCRF, PGW, MME, OAM server, RCAF, or any other network element, such as those shown or described in reference to FIGS. 1-3. Each of these devices may include at least one processor or control unit or module, respectively indicated as 914 and 924. At least one memory may be provided in each device, and indicated as 915 and 925, respectively. The memory may include computer program instructions or computer code contained therein. One or more transceiver 916 and 926 may be provided, and each device may also include an antenna, respectively illustrated as 917 and 927. Although only one antenna each is shown, many antennas and multiple antenna elements may be provided to each of the devices. Other configurations of these devices, for example, may be provided. For example, network element 910 and UE 920 may be additionally configured for wired communication, in addition to wireless communication, and in such a case antennas 917 and 927 may illustrate any form of communication hardware, without being limited to merely an antenna. In the case of such network elements as PCRF, MME, OAM server, and RCAF the device may be configured solely for wired communication.

Transceivers 916 and 926 may each, independently, be a transmitter, a receiver, or both a transmitter and a receiver, or a unit or device that may be configured both for transmission and reception. The transmitter and/or receiver (as far as radio parts are concerned) may also be implemented as a remote radio head which is not located in the device itself, but in a mast, for example. It should also be appreciated that according to the "liquid" or flexible radio concept, the operations and functionalities may be performed in different entities, such as nodes, hosts or servers, in a flexible manner. In other words, division of labor may vary case by case. One possible use is to make a network element to deliver local content. One or more functionalities may also be implemented as a virtual application that is as software that can run on a server.

A user device or user equipment 920 may be a mobile station (MS) such as a mobile phone or smart phone or multimedia device, a computer, such as a tablet, provided with wireless communication capabilities, personal data or digital assistant (PDA) provided with wireless communication capabilities, portable media player, digital camera, pocket video camera, navigation unit provided with wireless communication capabilities or any combinations thereof.

The user device or user equipment 920 may be a sensor or smart meter, or other device that may usually be configured for a single location.

In an exemplifying embodiment, an apparatus, such as a node or user device, may include means for carrying out embodiments described above in relation to any of FIGS. 4-8.

Processors 914 and 924 may be embodied by any computational or data processing device, such as a central processing unit (CPU), digital signal processor (DSP), application specific integrated circuit (ASIC), programmable logic devices (PLDs), field programmable gate arrays (FPGAs), digitally enhanced circuits, or comparable device or a combination thereof. The processors may be implemented as a single controller, or a plurality of controllers or processors. Additionally, the processors may be implemented as a pool of processors in a local configuration, in a cloud configuration, or in a combination thereof.

For firmware or software, the implementation may include modules or unit of at least one chip set (e.g., procedures, functions, and so on). Memories 915 and 925 may independently be any suitable storage device, such as a non-transitory computer-readable medium. A hard disk drive (HDD), random access memory (RAM), flash memory, or other suitable memory may be used. The memories may be combined on a single integrated circuit as the processor, or may be separate therefrom. Furthermore, the computer program instructions may be stored in the memory and which may be processed by the processors can be any suitable form of computer program code, for example, a compiled or interpreted computer program written in any suitable programming language. The memory or data storage entity is typically internal but may also be external or a combination thereof, such as in the case when additional memory capacity is obtained from a service provider. The memory may be fixed or removable.

The memory and the computer program instructions may be configured, with the processor for the particular device, to cause a hardware apparatus such as network element 910 and/or UE 920, to perform any of the processes described above (see, for example, any of FIGS. 4-8). Therefore, in certain embodiments, a non-transitory computer-readable medium may be encoded with computer instructions or one or more computer program (such as added or updated software routine, applet or macro) that, when executed in hardware, may perform a process such as one of the processes described herein. Computer programs may be coded by a programming language, which may be a high-level programming language, such as objective-C, C, C++, C#, Java, etc., or a low-level programming language, such as a machine language, or assembler. Alternatively, certain embodiments of the invention may be performed entirely in hardware.

Furthermore, although FIG. 9 illustrates a system including a network element 910 and a UE 920, embodiments of the invention may be applicable to other configurations, and configurations involving additional elements, as illustrated and discussed herein. For example, multiple user equipment devices and multiple network elements may be present (see, for example, FIGS. 1-3), or other nodes providing similar functionality, such as nodes that combine the functionality of a user equipment and an access point, such as a relay node.

Certain embodiments provide various benefits and/or advantages. For example, certain embodiments provide a deterministic solution that helps to address the drawbacks and limitations of the conventional approaches. Certain embodiments allow accurate identification of the serving cell of a certain UE. Certain embodiments can avoid a new interface from RCAF to MME/SGSN for querying the MME/SGSN for IMSIs based on cell ID. In short, certain embodiments provide a solution that allows the congestion information to be simply generated by the originator (eNB) and used by the end client (PCRF).

Another advantage may be that certain embodiments can avoid extensive configuration and additional signaling within the network. In certain embodiments, a single new information element in existing GTP-C, S1-AP and X2-AP signaling messages can be utilized. Thus, impact to existing nodes like PCRF, PGW, SGW, MME and eNB can be minimized. Also, the new RCAF node may be less complex compared to alternative approaches. Furthermore, in certain embodiments the core network and radio network have the ability to use a common secure identifier. This common secure identifier can help avoid exposing IMSI to insecure network elements/interfaces, including radio network and external entities, and can protect subscriber confidentiality.

The RUCI ID described above can be used by many features and not just UPCON, although UPCON is an example use case for the RUCI ID. In general, there is not conventionally a common ID between core and RAN, i.e. normally different use cases will use their own correlations IDs.

For instance, this common ID can also be used for MBMS congestion control where a common ID may be necessary between core network and radio network. For example, in addition to UPCON, in case of group communication the request can be initiated by the GCSE Application Server (GCS AS). The resulting information can be used to determine the number of users camping in a certain cell in order to determine whether multicast, broadcast or unicast should be performed for group communication. Thus, certain embodiments may assist Group Call eMBMS congestion management and decision to initiate group communication.

Furthermore, certain embodiments may assist an identifier retrieval procedure for location based services. Likewise, certain embodiments may provide for identifier retrieval in a certain cell for network dimensioning. Indeed, in general, certain embodiments may be applied in any use case that utilizes a common secure identifier between radio network and core network entities like PCRF/PGW/SGW/AF.

One having ordinary skill in the art will readily understand that the invention as discussed above may be practiced with steps in a different order, and/or with hardware elements in configurations which are different than those which are disclosed. Therefore, although the invention has been described based upon these preferred embodiments, it would be apparent to those of skill in the art that certain modifications, variations, and alternative constructions would be apparent, while remaining within the spirit and scope of the invention. In order to determine the metes and bounds of the invention, therefore, reference should be made to the appended claims.

LIST OF ABBREVIATIONS

3GPP 3rd Partnership Project
APN Access Point Name
AF Application Function
CN Core Network
CP Control Plane
C-RUCI-ID Correlation RUCI ID
EPC Evolved Packet Core
IMSI International Mobile Subscriber Identity
IP Internet Protocol
LTE Long Term Evolution
MME Mobility Management Entity
PCC Policy and Charging Control
PCEF Policy and Charging Enforcement Function
PCRF Policy and Charging Rules function
P-GW/PGW Packet Data Network Gateway
PDN Packet Data Network
RCAF RAN Congestion Application Function
RUCI RAN user plane congestion information
SGSN Serving GPRS Support Node
S-GW/SGW Serving Gateway
TDF Traffic Detection Function
UE User Equipment
UP User Plane

We claim:

1. A method, comprising:
generating, by a device, a correlation identifier for a user equipment and/or a packet data network connection; and
sending, by the device, the correlation identifier to a network element,
wherein the correlation identifier correlates the user equipment and/or the packet data network connection to a core network element, and
wherein the correlation identifier correlates the user equipment between the core network and the radio access network.

2. The method of claim 1, further comprising:
checking, by the device, whether a suitable correlation identifier exists prior to generating the correlation identifier.

3. The method of claim 1, further comprising:
locally storing the correlation identifier at the device; or
storing the correlation identifier centrally in a database.

4. The method of claim 1, wherein the device comprises a policy and charging rules function, group communication system enabler application server, or an application function.

5. The method of claim 1, wherein the correlation identifier comprises an identifier of the user equipment and/or the packet data network connection and comprises an identifier of the core network element.

6. A method, comprising:
receiving, at a device, a correlation identifier for a user equipment and/or a packet data network connection; and
forwarding, by the device, the correlation identifier to a further network element,
wherein the correlation identifier correlates the user equipment and/or the packet data network connection to a core network element,
wherein the correlation identifier correlates the user equipment between the core network and the radio access network.

7. The method of claim 6, further comprising:
locally storing the correlation identifier; or
storing the correlation identifier centrally in a database.

8. The method of claim 6, further comprising:
detecting an update in a congestion status; and
reforwarding the correlation identifier to the further network element.

9. The method of claim 6, further comprising:
receiving a location request or other request to provide correlation identifiers; and
reforwarding, based on the location request or the other request, the correlation identifier to the further network element.

10. The method of claim 6, wherein the device comprises at least one of a packet data network gateway, a mobility management entity, or an operations administration and maintenance server and the further network element comprises at least one of a mobility management entity, a base station, or a radio access network congestion application function.

11. A method, comprising:
preparing, by a device, a report of congestion including a correlation identifier for a user equipment and/or a packet data network connection; and
sending, by the device, the report to an operations, administration and maintenance server,
wherein the correlation identifier correlates the user equipment and/or the packet data network connection to a core network element,
wherein the correlation identifier correlates the user equipment between the core network and the radio access network.

12. The method of claim 11, further comprising;
providing, by the device, the correlation identifier to a target base station when handing the user equipment to the target base station.

13. The method of claim 11, wherein the device comprises a base station.

14. A method, comprising;
receiving, at a device, congestion report including a correlation identifier for a user equipment and/or a packet data network connection;
identifying, by the device, a policy and charging rules function to which to send the congestion report based on the correlation identifier; and
sending, by the device, the congestion report to the policy and charging rules function,
wherein the correlation identifier correlates the user equipment and/or the packet data network connection to a core network element.

15. The method of claim 14, wherein the device comprises a radio access network congestion application function.

16. An apparatus, comprising:
at least one processor; and
at least one memory including computer program code,
wherein the at least one memory and the computer program code are configured to, with the at least one processor, cause the apparatus at least to
generate a correlation identifier for a user equipment and/or a packet data network connection; and
send the correlation identifier to a network element,
wherein the correlation identifier correlates the user equipment and/or the packet data network connection to a core network element, and
wherein the correlation identifier correlates the user equipment between the core network and the radio access network.

17. The apparatus of claim 16, wherein the at least one memory and the computer program code are configured to, with the at least one processor, cause the apparatus at least to check whether a suitable correlation identifier exists prior to generating the correlation identifier.

18. The apparatus of claim 16, wherein the at least one memory and the computer program code are configured to, with the at least one processor, cause the apparatus at least to:
locally store the correlation identifier at the device; or
store the correlation identifier centrally in a database.

19. The apparatus of claim 16, wherein the apparatus comprises a policy and charging rules function, group communication system enabler application server, or an application function.

20. An apparatus, comprising:
at least one processor; and
at least one memory including computer program code,
wherein the at least one memory and the computer program code are configured to, with the at least one processor, cause the apparatus at least to
receive a correlation identifier for a user equipment and/or a packet data network connection; and
forward the correlation identifier to a further network element,
wherein the correlation identifier correlates the user equipment and/or the packet data network connection to a core network element,
wherein the correlation identifier correlates the user equipment between the core network and the radio access network.

21. The apparatus of claim 20, wherein the at least one memory and the computer program code are configured to, with the at least one processor, cause the apparatus at least to:
locally store the correlation identifier; or
store the correlation identifier centrally in a database.

22. The apparatus of claim 20, wherein the at least one memory and the computer program code are configured to, with the at least one processor, cause the apparatus at least to:
detect an update in a congestion status; and
reforward the correlation identifier to the further network element.

23. The apparatus of claim 20, wherein the at least one memory and the computer program code are configured to, with the at least one processor, cause the apparatus at least to:
receive a location request or other request to provide correlation identifiers; and
reforward, based on the location request or the other request, the correlation identifier to the further network element.

24. The apparatus of claim 20, wherein the apparatus comprises at least one of a packet data network gateway, a mobility management entity, or an operations administration and maintenance server and the further network element comprises at least one of a mobility management entity, a base station, or a radio access network congestion application function.

25. An apparatus, comprising:
at least one processor; and
at least one memory including computer program code,
wherein the at least one memory and the computer program code are configured to, with the at least one processor, cause the apparatus at least to
prepare a report of congestion including a correlation identifier for a user equipment and/or a packet data network connection; and
send the report to an operations, administration and maintenance server,
wherein the correlation identifier correlates the user equipment and/or the packet data network connection to a core network element,
wherein the correlation identifier correlates the user equipment between the core network and the radio access network.

26. The apparatus of claim 25, wherein the at least one memory and the computer program code are configured to, with the at least one processor, cause the apparatus at least to provide the correlation identifier to a target base station when handing the user equipment to the target base station.

27. The apparatus of claim 25, wherein the apparatus comprises a base station.

28. An apparatus, comprising;
- at least one processor; and
- at least one memory including computer program code,
  - wherein the at least one memory and the computer program code are configured to, with the at least one processor, cause the apparatus at least to
  - receive congestion report including a correlation identifier for a user equipment and/or a packet data network connection;
  - identify a policy and charging rules function to which to send the congestion report based on the correlation identifier; and
  - send the congestion report to the policy and charging rules function,
  - wherein the correlation identifier correlates the user equipment and/or the packet data network connection to a core network element.

29. The apparatus of claim 28, wherein the apparatus comprises a radio access network congestion application function.

* * * * *